Dec. 13, 1960     C. T. WITTL ET AL     2,964,139
PNEUMATIC SHOCK ABSORBER

Filed May 1, 1957     3 Sheets-Sheet 1

INVENTOR.
CASIMIR T. WITTL
FRANK J. JENKINS
BY
ATTORNEY

Dec. 13, 1960                C. T. WITTL ET AL                2,964,139
                           PNEUMATIC SHOCK ABSORBER
Filed May 1, 1957                                            3 Sheets-Sheet 2

INVENTOR.
CASIMIR T. WITTL
FRANK J. JENKINS
BY
R. L. Miller
ATTORNEY

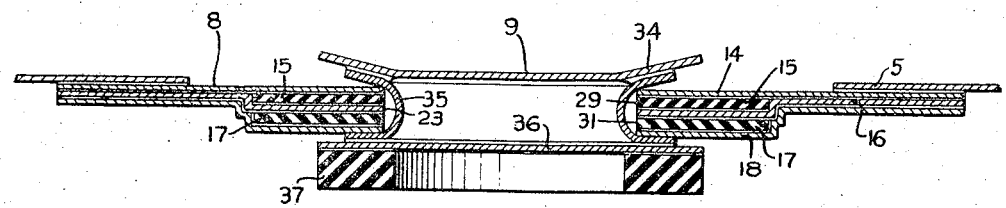
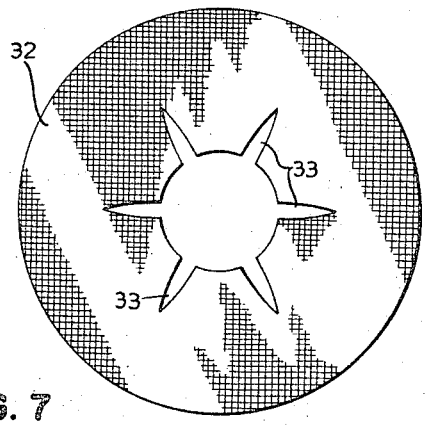
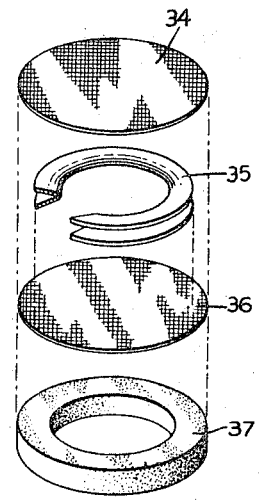
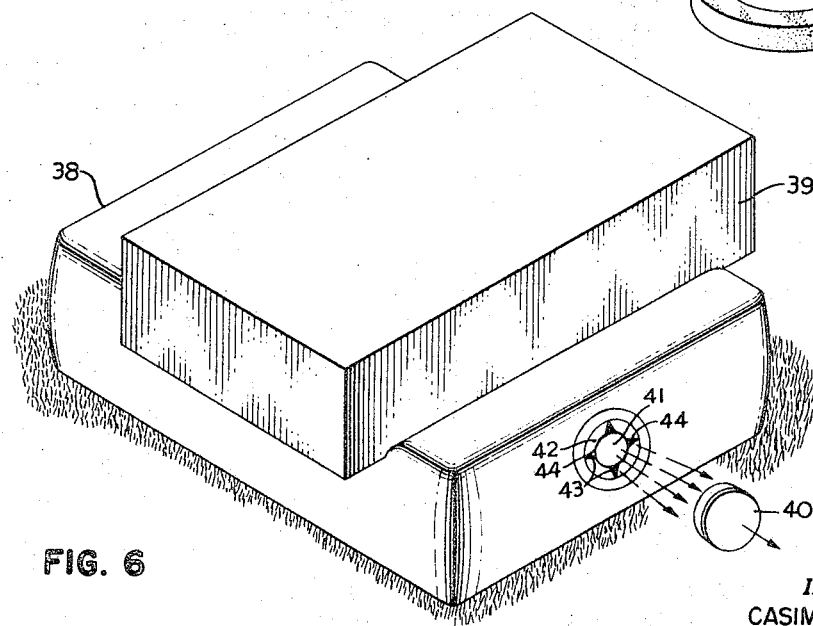

United States Patent Office 2,964,139
Patented Dec. 13, 1960

2,964,139

PNEUMATIC SHOCK ABSORBER

Casimir T. Wittl, Tallmadge, and Frank J. Jenkins, Akron, Ohio, assignors to The Goodyear Tire & Rubber Company, Akron, Ohio, a corporation of Ohio Filed May 1, 1957, Ser. No. 656,304

7 Claims. (Cl. 188—87)

This invention relates to shock absorbers for fluid systems in general and in particular to a shock absorber for use under high impact conditions.

It is a principal object of this invention to provide a device which affords shock absorption through controlled pressure by metering a fluid in a system upon rise or subsequent fall of the pressure in the system.

It is a further object of this invention to provide a shock absorber which results in the controlled deceleration of an object attached thereto upon the occurrence of high impact.

It is a still further object of this invention to provide shock absorption in a fluid system only when the pressure therein exceeds a predetermined minimum.

It is an additional object of the present invention to provide a shock absorber which is of simple yet rugged construction and is completely reliable due to the absence of complicated mechanical elements.

These and other objects of the invention will become clear from the following description and drawings in which:

Fig. 3 is a cross-section view of the pressure control assembly of the device in Fig. 2;

Fig. 5 is an exploded view of an orifice plug assembly according to this invention;

Fig. 6 illustrates the operation of a decelerator bag according to the invention;

Fig. 7 illustrates a modification of an element of the control assembly; and

Figure 1:
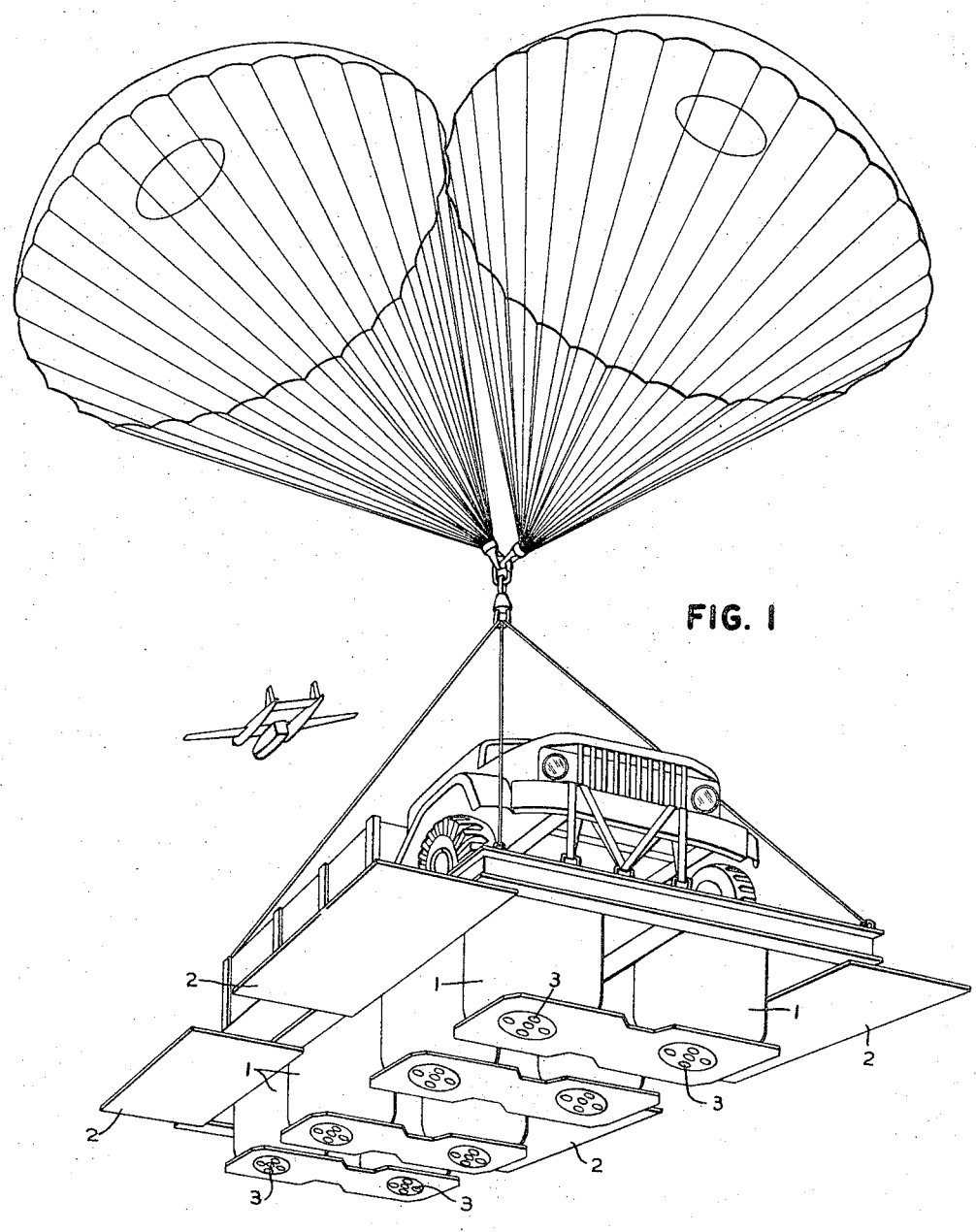
Fig. 1 illustrates one use of the present invention.

Devices which permit controlled release of pressure from a closed system have broad application. An example of one such application is the controlled release of surge pressures in industrial processes wherein fluids are pumped through long equipment trains. "Pop" type mechanical valves for release of high pressures are familiar to individuals in many arts and have been used for many years. However, frequently it is necessary that the release of pressure from a system be effected in a manner so that an increased escape path is provided when the pressure is high and a decreasing escape path as the pressure lowers. Constant area orifices are ineffective for such purposes for obvious reasons. Attempts have been made to provide variable orifices which react automatically to the pressure in the system through the use of spring loaded ball valves, etc. Yet difficulties have arisen in providing mechanical reliability in such valves due to the mechanical complexity of the control. Further, such devices are found inapplicable to pressure systems wherein the orifice area must be large initially, be capable of varying its area over wide ranges, and afford total pressure release in the system. It will become apparent from the following description of one illustrative use of the present invention that the contro elements therein disclosed will provide a solution to man of the problems referred to above.

In many fields it is desirable, and frequently absolutel necessary, to cushion an object or package against hig impact shock. One such field, used here as illustrativ of one use of the present invention, is that of the deliver of equipment and supplies to remote or relatively in accessible areas by air-drop; for example the delivery o military equipment and supplies, forest fire fighting ap paratus, and rescue gear and emergency rations. In th past, delivery of small relatively rugged items could b effectively made by the use of a parachute attached t the item to be dropped which reduced the vertical descen rate to a low value. However, increases in the size weight, and shock sensitivity of the articles to be de livered, for example, a tank; and the need for highe descent rates have severely limited the use of parachut means alone. It can be readily appreciated that a mer increase in the size and number of parachutes attache to the package to be delivered will not provide a solu tion to the problem. In the first place, there is a maxi mum practical parachute size which is a limiting facto and, secondly, an increase in chute size tends to reduc the descent rate. The latter condition is frequently un desirable since, in the case of military drops, the equip ment may be under hostitle gunfire during the time o its descent and in many applications a restricted deliver space may require that the items be delivered from relatively low altitude and at an increased descent rate i order to hit the designated target area. Therefore, th need for a device, generally referred to in the art as decelerator bag, which will permit higher descent rate but will reduce impact shock effects has arisen. Th present invention may be very advantageously used fo this purpose and for purposes of illustration will be de scribed with specific reference to such an application However, as will become apparent as the descriptio proceeds, the invention is by no means limited to sucl a use.

Although the invention will be described in detail sub sequently, the principal feature may be described in gen eral terms as a pressure release orifice which is so con structed that the orifice area automatically varies abov a finite minimum value in direct relation to the pressur differential at the orifice and the flow of fluid there through. As a consequence of this action, the highsid or forepressure at the orifice is reduced in a controlle manner. Utilizing the example of a decelerator bag, th deceleration rate of the load is reduced to a value belov its uncushioned figure, i.e. the total time to decelerate th load from the velocity at impact to a zero velocity is in creased and the maximum deceleration rate is reduced Referring to the drawings, Fig. 1 shows decelerato bags 1, made in accordance with the present invention, a they might be used to cushion the landing shock of large vehicle being air-dropped.

During storage and transportation of the assembly t be air-dropped, the bags 1 are held in a collapsed condi tion against the underside of the load. Fig. 1 illus trates one means of controlling the positioning and re lease of the bags 1 which comprises hinged doors 2 whicl hold the bags in a collapsed state until actuation of th parachute means which in turn releases the doors permit ting inflation of the bags through vents 3 in the botton thereof. The vents 3 in the bags 1 allow bag inflatior to occur either by permitting up-rushing air to enter o permitting the weight of the bag itself to create a pressur differential sufficient to draw air flow through the vents Upon impact with the ground, the vents are sealed b any convenient means, for example a flap, and a con trolling orifice and plug assembly (not shown) in th top of the bag actuates in a manner which will subsequently be described to provide controlled deceleration of the equipment and platform.

Figure 2:
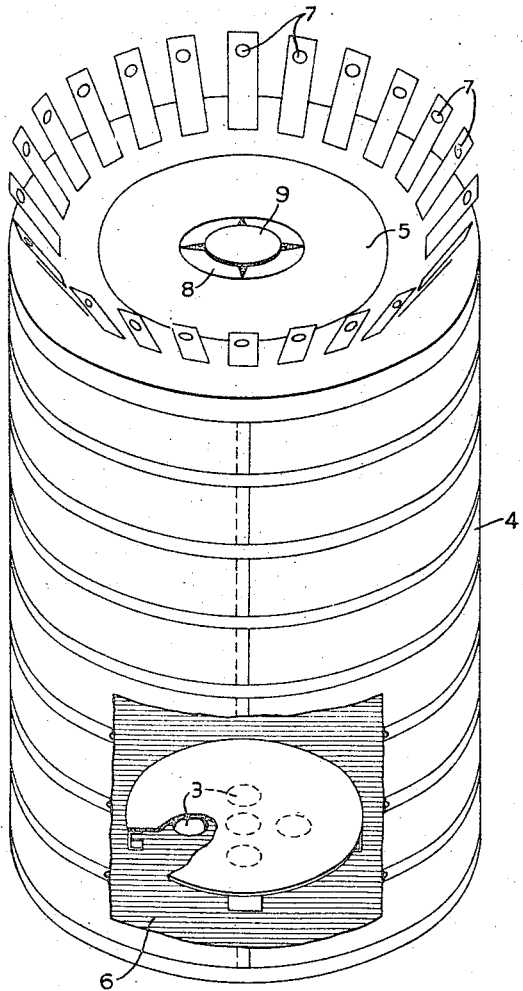
Fig. 2 is a partial section of a device according to the invention.

A decelerator bag is shown in detail in Fig. 2 consisting of a generally cylindrical bag 4 with a top 5 and a bottom 6. The bag 4 may be made of a variety of materials; for example, rubber-coated nylon in built-up plies, or other coated fabrics or elastomers, etc. The bag 4 is substantially fluid-impervious, flexible and inflatable. Tabs 7 may be secured about the top and bottom portions of the bag to aid in securing the bag to the platform or package to be dropped. As shown in Fig. 2, the bag 4 has inlet vents 3 cut or molded in the bottom 6 which permit air to inflate the bag in a manner previously explained. A control orifice and plug assembly is mounted in the top 5.

Figure 8:
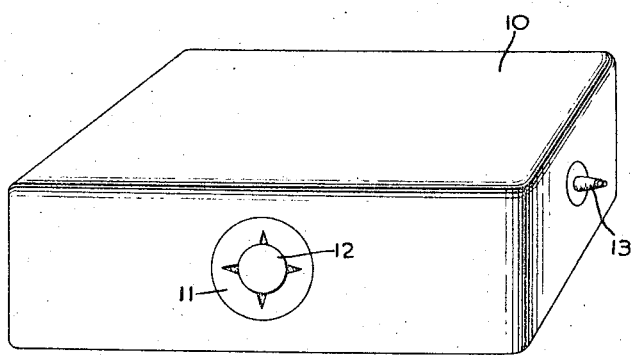
Fig. 8 illustrates a modified form of the invention.

The control orifice 8 and plug assembly 9 are shown in cross-section in Fig. 3. The control orifice assembly 8 is made up of a plurality of elements which will be described in detail subsequently. Plug assembly 9 is seated in the orifice assembly 8. Plug assembly 9 has two principal functions. Firstly, it acts to seal the orifice during inflation of the bag to its initial pressure. Secondly, through proper design as to plug diameter etc., the plug can be made to remain seated in the orifice assembly even after initial impact until the pressure in the bag has reached a predetermined minimum. The advantage of this may be more clearly understood by reference to the bag shown in Fig. 8. There shown is a shock absorber 10 generally rectangular or cushion-shaped having a control orifice 11 with plug 12 in the side thereof. Inflation of the bag 10 is accomplished in any suitable manner, for example, through a valve 13 shown in one side of the bag 10. With the type of shock absorber shown in Fig. 8, i.e. a preinflated type, proper design of the plug so that a predetermined minimum pressure above initial inflation pressure is required to eject the plug from the orifice will avoid its accidental discharge through shocks encountered during normal handling and transportation. In addition, upon occurrence of high impact which causes ejection of the plug, the opening of the orifice to meter fluid from the system is nearly instantaneous.

Figure 4:
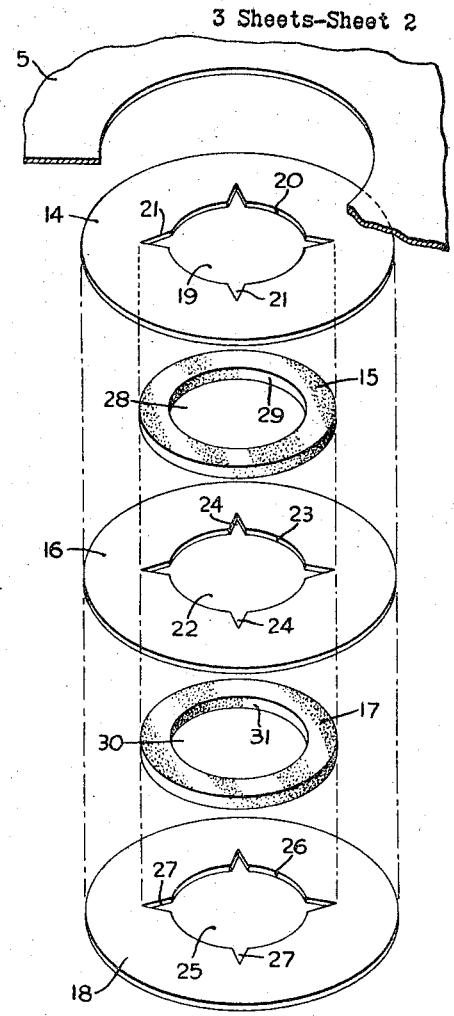
Fig. 4 is an exploded view of the control assembly of Fig. 3.

Referring to Fig. 4, the details of a typical control orifice assembly may be seen. In order, proceeding from top to bottom, is the top 5 of the bag, a control diaphragm 14 made of substantially inextensible material, a resilient grommet 15, a second control diaphragm 16, a second resilient grommet 17, and a third control diaphragm 18 similar to the others. The same elements can be seen assembled in cross section in Fig. 3. The control diaphragms 14, 16 and 18 have apertures 19, 22 and 25 respectively in the center thereof defined by peripheral edges 20, 23 and 26 respectively. The peripheral edge 20 of the opening 19 has spaced serrations 21 extending radially outwardly. Similar serrations 24 and 27 appear in the peripheral edges 23 and 26 which define openings 22 and 25 in control diaphragms 16 and 18 respectively. These serrations are generally V-shaped in character, but it is obvious that the shape of the serrations, their number and distribution may be varied to provide the particular orifice characteristics desired. As an example, a control diaphragm 32 with a greater number of serrations 33 of slightly different shape is illustrated in Fig. 7.

Between the control diaphragms, which are preferably elastomer coated fabric, although the fabric may be dispensed with in some instances if desired, are sandwiched the reinforcing grommets 15 and 17 in the manner illustrated in Figs. 3 and 4. The grommets 15 and 17 are composed of a resilient elastomeric material and have openings 28 and 30 therein defined by the peripheral edges 29 and 31 respectively. The openings 28 and 30 are of substantially the same diameter as the openings 19, 22 and 25 in the control diaphragms. The individual elements of the orifice assembly are juxtapositioned as shown in Fig. 4 and joined into an integral structure as appears in Fig. 3.

It can be seen that the pressure of the contained air on the assembly will tend to force the portions adjacent serrations 21, 24 and 27 of the control diaphragms 14, 16 and 18 axially and radially outward, much in the fashion the petals of a flower open. However, this movement is restrained by the resilient grommets 15 and 17. Hence, although a greater pressure will result in a larger orifice and consequently a more rapid pressure decrease, the rate of decrease in pressure is controlled by the resistance of the grommets 15 and 17 to expansion. It is clear that the grommet material may be selected or compounded to give a wide range of elastic characteristics for application in a variety of situations. In addition, an orifice assembly of a lesser number of elements may be used in many cases, for example, an assembly of one diaphragm with one grommet.

Fig. 5 illustrates an orifice plug assembly in exploded form. In order from top to bottom are a first plug cap 34, an annular seating ring 35 having, as shown, a substantially V-shaped cross section, a second plug cap 36, all preferable of elastomer coated fabric, and a retaining ring 37, preferably made of an elastomer. These elements are assembled into an integral structure to form the plug assembly 9 seated within the orifice control assembly 8 as seen in Fig. 3. It is apparent from Fig. 3 that the plug assembly is sized so that the cap elements 34 and 36 and the retaining ring 37 will not freely pass through the orifice when it is in its normally relaxed position. This prevents accidental dislodgment of the plug and also determines, together with the resistance of grommets 15 and 17, the minimum pressure required to eject the plug from the orifice. In addition, an internal bag pressure slightly in excess of the external pressure will result in a seal between the plug and control diaphragm 18, thereby preventing any substantial loss of inflating medium prior to impact.

Fig. 6 is illustrative of the action of the control orifice and plug assembly, the former having a single diaphragm and grommet. As there shown, a decelerator bag 38 with a large mass 39 attached thereto has contacted the ground at the conclusion of an air drop.

Upon an abrupt rise in internal pressure in the bag due to impact, the orifice 41 and flap portions 42 are stressed and forced outward and radially away from the centerline of the orifice, and at the same time the pressure acting on the inner plug face forces the plug against flap portions 42. When the force exerted on the plug reaches a predetermined minimum, the orifice area, due to the combined forces of radial stress on the orifice and the direct force of the plug on the orifice, is sufficiently increased to permit passage of the plug 40 and the plug is ejected from the orifice 41. After the plug 40 is ejected the flaps of the orifice adjacent serrations 43 are forced outward from the bag and radially away from the orifice center due to high internal pressure or pulled inwardly by the elastic grommets, depending on the intensity of bag pressure and the recovery characteristics of the grommets. The first action increases the effective orifice area and permits rapid release of high initial surge pressure in the bag and at the same time, because of the resistance of the grommet 44, assures a restricted flow of air to slow the descent of the mass 39, resulting in a reduction in the recoil shock thereto. As the mass 39 loses momentum, the instantaneous pressure in the decelerator bag drops and the velocity of the air flowing through the orifice 41 decreases. Upon a decrease in air pressure or the existence of a lower initial bag pressure the elastic grommet 44 attached to the flaps 42 of the orifice draws the orifice back towards its normal position decreasing the orifice area and, therefore, increasing resistance to air flow from the bag. Thus, a second action of the orifice is to contract upon a reduction in internal pressure or a low initial pressure to prevent explosive loss of the air in the bag and thereby provide a further cushioning action on the mass 39. However, the bag is completely deflated at the end of the decelerator period due to the provision of a minimum orifice through the aperture in the diaphragm center.

It is clear that there are further advantages to be gained from the present invention over a completely sealed bag or one with a constant pressure release system of the pop-valve variety. The former type of bag has inherently too much bounce for satisfactory delivery characteristics and, furthermore, is subject to blowouts if the impact is a great one. The latter type of bag provides a controlled cushioning primarily only up to the point at which the release valve pops and is thereafter essentially a constant orifice system, i.e. it lacks the flexible characteristics of the control orifice of the present invention which opens in response to high pressure and recovers upon occurrence of low pressure to provide a terminal deceleration rate determined by the unexpanded orifice area.

Furthermore, unlike the control assembly of the present invention, mechanical valves, etc. are subject to failure due to the extremes in temperature encountered in air drops which are of the range of $-40°$ F. to $160°$ F. and also corrosion or clogging due to moisture, dust and sand encountered in many climates. The present invention avoids such problems due to its simplicity and the absence of moving parts in contrast to mechanical valves which vary in performance to the point of failure as the environmental factors change from one extreme to another, and which also present substantial difficulties due to inertial effects of the mechanical elements.

While the present invention has been described with particular reference to a decelerator bag for parachute drops, it is clear that the control assembly may be utilized in a variety of bags which are adaptable to other tasks; for example, the cushioning of heavy objects such as crates being dropped from the tail gate of a truck or of heavy objects being selected or moved in a warehouse. In addition, as previously mentioned, the pressure control feature may also be used to advantage as a pressure and flow sensitive orifice for surge control in a number of systems containing fluid under pressure.

While certain representative embodiments and details have been shown for the purpose of illustrating the invention, it will be apparent to those skilled in this art that various changes and modifications may be made therein without departing from the spirit or scope of the invention.

We claim:

1. A decelerator bag comprising in combination a flexible inflatable bag having at least one opening therein whereby pressure may be released from said bag; means to inflate said bag; means for controlled deflation of said bag, said means comprising a variable orifice assembly mounted in said opening in said bag and including at least one diaphragm with an aperture therein, said diaphragm having a plurality of serrations extending radially outwardly from the periphery of said aperture, a resilient grommet secured to said diaphragm with its inner edge substantially coextensive with the periphery of said aperture in said diaphragm; and closure means sealing said aperture in said diaphragm, said closure means being actuated to unseal said aperture upon an increase in the inflation pressure in said bag to a predetermined value.

2. A decelerator bag as claimed in claim 1 in which said closure means includes a plug releasably seated in and adapted to seal said aperture.

3. A pneumatic shock absorber comprising in combination a flexible inflatable bag of substantially inextensible air-impervious material having at least one opening therein whereby pressure may be released from said bag; means to inflate said bag; means mounted in said opening in said bag for controlled deflation of said bag, said m including at least one substantially inextensible diaphr with an aperture therein, said diaphragm having a rality of serrations extending radially outwardly f the outer periphery of said aperture, a resilient grom secured to said diaphragm with its inner periphery stantially coextensive with the periphery of said aper in said diaphragm, and closure means adapted to said openings until the inflation pressure in said bag creases to a predetermined value due to impact.

4. A pneumatic shock absorber to provide contro deceleration under high impacts comprising in comb tion a flexible inflatable bag having at least one oper therein whereby pressure may be released from said l means to inflate said bag; orifice means in said oper in said bag including at least one diaphragm with aperture therein, said diaphragm having a plurality radially outwardly extending serrations spaced along periphery of said aperture, said serrations so construc and arranged to permit the portions of said diaphra; adjacent said serrations to move axially and radiall; response to pressure thereon to vary the effective ori area in direct relation to the pressure thereon over s stantially all of the deceleration period and a resil; grommet secured to said diaphragm with its inner e substantially coextensive with the periphery of said a; ture in said diaphragm; and closure means adapted to s said orifice means until the inflation pressure exceed predetermined value to actuate said closure means to o said apertures to permit the controlled release of s pressure.

5. A pneumatic shock absorber for high impact comprising in combination a flexible inflatable bag substantially inextensible air-impervious material hav at least one opening therein whereby pressure may released from said bag; means to inflate said bag; v; able orifice means mounted in said opening in said l to provide controlled deflation thereof, said orifice me comprising at least one substantially inextensible c phragm mounted in the opening in said bag and hav an aperture therein, said diaphragm having a plura of spaced apart radially outwardly extending serrati; along the periphery of said aperture, and a resilient gro met secured to said diaphragm with its inner edge s; stantially coextensive with the periphery of said ap ture in said diaphragm, and plug means adapted to s said aperture in said diaphragm until the inflation p; sure in said bag exceeds a predetermined value due impact transmitted to said bag.

6. A pneumatic shock absorber for high impact comprising in combination a flexible inflatable bag substantially inextensible material having at least c opening therein whereby pressure may be released fr; said bag; means to inflate said bag; variable orifice me; mounted in said opening to provide controlled deflat; of said bag, said orifice means comprising at least c diaphragm and having an aperture therein, said d; phragm having radially outwardly extending serratic spaced along the periphery of said aperture so construc; and arranged to permit the portions of said diaphra; adjacent said serrations to move axially and radially response to pressure thereon to vary the effective orif area, and an elastic grommet secured to said diaphra; with its inner edge substantially coextensive with 1 periphery of said aperture in said diaphragm; and clos; means adapted to seal said aperture in said diaphra; until the inflation pressure in said bag exceeds a p determined value due to impact transmitted to said b;

7. A shock absorber for controlled deceleration un; high impact comprising in combination a flexible flatable article having at least one opening therein whe by pressure may be released from said article; means inflate said article to a predetermined pressure; an orif assembly mounted in said opening to release said pr sure completely and at a rate which varies in direct relation to the instantaneous pressure therein over substantially all of the deceleration period, said assembly including at least one diaphragm with an aperture therein and being radially serrated along the periphery of said aperture, a resilient grommet secured to said diaphragm with its inner edge substantially coextensive with the periphery of said aperture in said diaphragm; and an elastic plug adapted for use as a closure for said opening in said diaphragm; said grommet, diaphragm and plug so constructed and cooperatively arranged that said plug is ejected from said diaphragm aperture when said inflation pressure increases to a predetermined value upon impact.

References Cited in the file of this patent

UNITED STATES PATENTS

| | | |
|---|---|---|
| Re. 20,887 | Mercier | Oct. 18, 1938 |
| 2,593,315 | Kraft | Apr. 15, 1952 |
| 2,694,569 | Gouirand | Nov. 16, 1954 |
| 2,706,605 | Rose et al. | Apr. 19, 1955 |
| 2,712,913 | Stanley | July 12, 1955 |
| 2,713,466 | Fletcher et al. | July 19, 1955 |
| 2,840,194 | Mitchell et al. | June 24, 1958 |

FOREIGN PATENTS

| | | |
|---|---|---|
| 61,376 | France | Feb. 9, 1951 |
| | (1st Addition of No. 1,009,277) | |